United States Patent Office 3,081,625
Patented Mar. 19, 1963

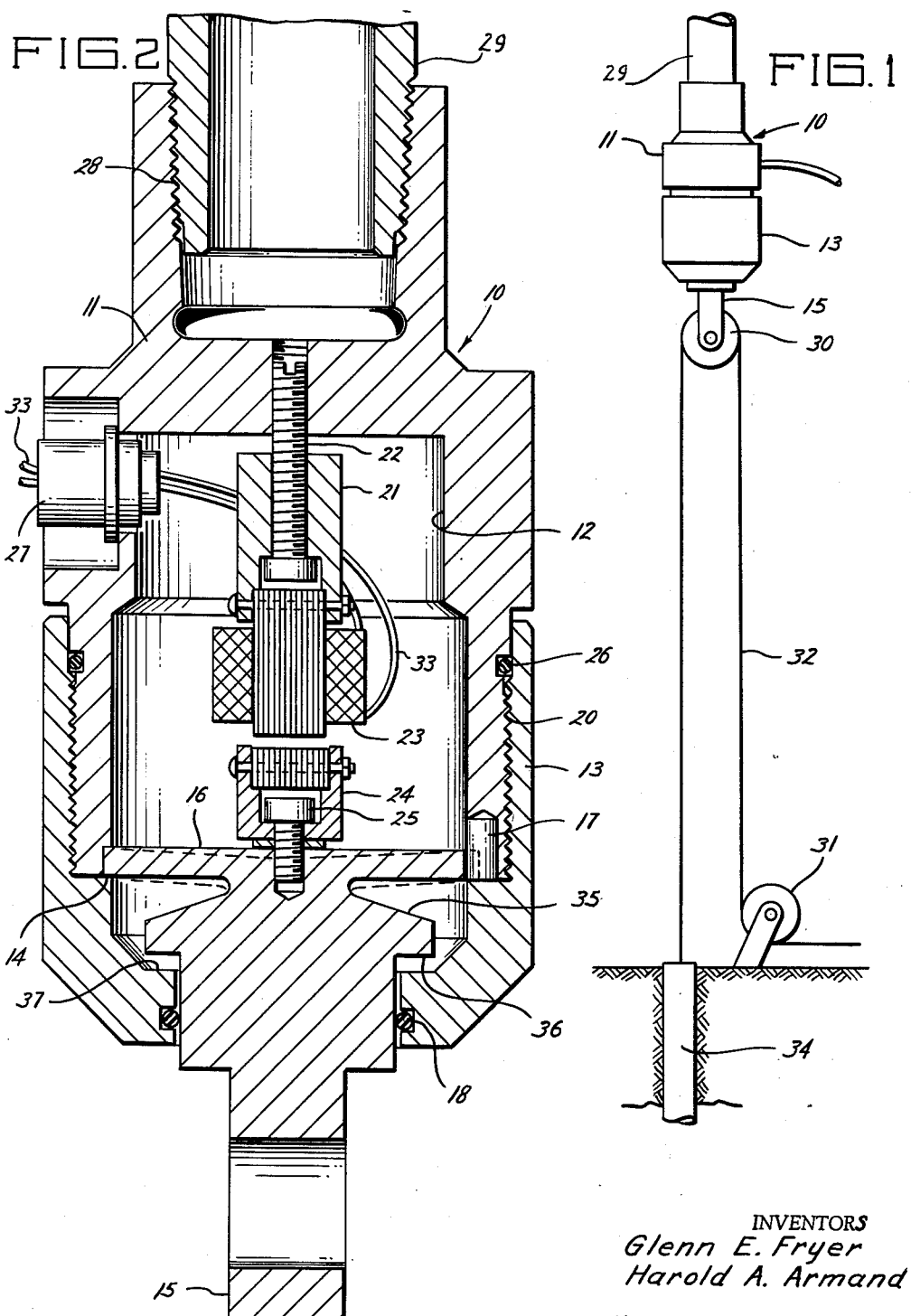

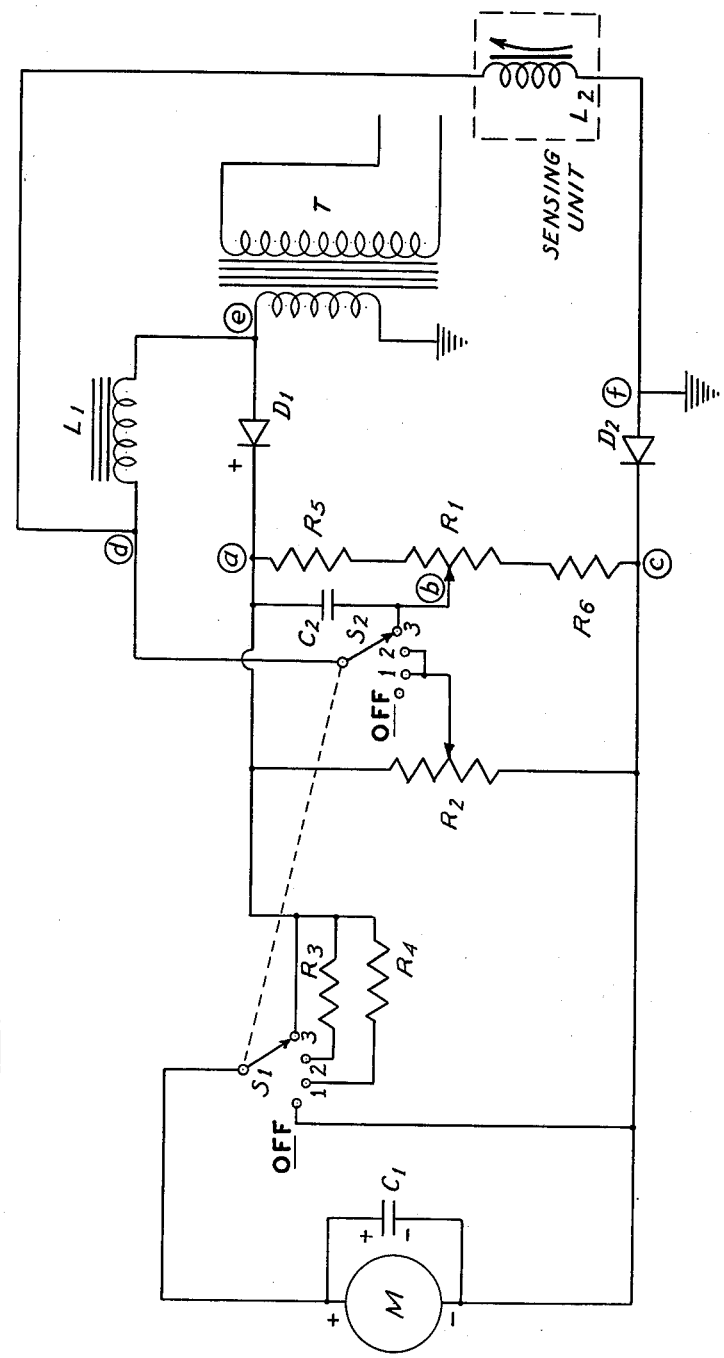

3,081,625
ELECTRONIC WEIGHT INDICATOR
Glenn E. Fryer and Harold A. Armand, Houston, Tex., assignors to Great Lakes Carbon Corporation, New York, N.Y., a corporation of Delaware
Filed Mar. 25, 1957, Ser. No. 648,030
1 Claim. (Cl. 73—141)

This invention relates to a device for measuring the magnitude of a suspended weight and is particularly adaptable in connection with the drilling, servicing and maintenance of well bores. More particularly, this invention relates to a device known as a weight indicator or weightometer which is particularly suitable for measuring the magnitude of a weight suspended in a well bore or casing, and also for measuring any changes in weight which may occur during the aforesaid operations.

In connection with the drilling, servicing and maintenance of well bores, such as oil and gas wells it is desirable to insert a wide variety of tools in the bore or the casing. These services include electric and radioactive logging by means of appropriate tools, perforating of casing and the surrounding formation by means of bullet guns or shaped charges, the placing of packers, cement, gravel, and miscellaneous chemicals at various elevations, etc. When a tool appropriate to the foregoing services is lowered into the well bore or casing it is desirable not only to know the total weight of the tool and the cable to which it is attached, but it is also very useful to have knowledge of any obstructions in the well which hinder the downward or upward path of the tool. This prevents or at least minimizes the chances of the loss of the tool itself caused by parting of the cable, particularly under emergency conditions.

It is the primary object of this invention to provide an electronic device which will measure the total magnitude of a suspended weight together with collateral equipment used to support said weight.

It is a further object of the invention to provide an electronic device which will measure very small changes in a suspended weight in the presence of a large total load.

It is a further object of the invention to provide an electronic device which will have extremely good sensitivity in measuring the magnitude of a suspended weight.

It is a further object of the invention to provide an electronic device which will detect irregularities and obstructions in a well bore or casing as a suspended tool is lowered or raised therein.

Generally speaking, the electronic device which we have developed for measuring the magnitude of a suspended weight and any changes or variations in the weight consists of a combination comprising a housing containing a variable inductor, means connecting one end of the inductor coil to the housing to adjustably secure the coil in position with respect to the inductor armature, a diaphragm supportably positioned directly beneath the face of, and substantially normal to the axis of the inductor coil and adapted to form a concave or "dished" configuration under tension load applied to the diaphragm normal to its surface, and inductor armature adjustably secured to the upper surface of said diaphragm and aligned parallel to the face of, and normal to the axis of the inductor coil, means connected to the lower surface of the diaphragm movably intersecting the wall of said housing and communicating with load-bearing means external of said housing, means for electrically energizing the inductor coil and means for measuring the resulting lowered inductance in the coil as the armature is withdrawn therefrom when a tension load is applied to the diaphragm.

The invention can best be described with reference to the drawings in which;
FIGURE 1 is a general view of the weight indicator.
FIGURE 2 is a sectional view of the weight indicator.
FIGURE 3 is a schematic diagram of the electronic circuit employed in conjunction with the weight indicator.

Referring now to the drawings there is shown a preferred embodiment of our invention but it should be understood that the invention is not limited to the specific mechanical details therein shown.

In FIGURE 1 the electronic weight indicator is generally shown at 10 suspended from a pipe adapter 29 which is attached to a derrick elevator (not shown). On the bottom or cap portion 13 of the weight indicator there is attached a connecting member such as a hook or eye 15 which is used for supporting a pulley or sheave 30. A cable 32 from a winch truck is threaded through a pulley 30 and also through pulley 31. At the end of the cable there is attached a well tool (not shown) which is positioned in casing 34. A two conductor cable 33 which leads to the electronic circuit (FIG. 3) in a panel truck (not shown) is attached to and leads into the body portion 11 of the weight indicator.

FIGURE 2 is a detailed full scale drawing, in section, showing a preferred embodiment of the invention. The weight indicator is shown generally at 10 and includes a housing consisting of an upper body portion 11 and a lower cap portion 13 which are threadably secured together to form a cavity 12 inside the housing. Positioned in the top part of the upper body portion 11 is a threaded connection 28 which permits the use of suitable accessories for attaching the unit to a fixed support, i.e. a derrick, for example by means of a pipe adapter.

Positioned in the upper body portion 11 of the housing in support member 21 is a variable inductor or sensing unit consisting of a sensing coil 23 wound on a laminated iron coil core and secured to the top inside wall of the body portion 11 by means of an adjustable set screw 22. A connection of the coil 23 to an electronic circuit, subsequently described herein and located in a panel truck, is made by means of a two conductor cable 33 of suitable length which is inserted in connector 27 positioned in the upper body portion 11 of the housing.

Positioned below the face of the coil 23 and supported in housing cap 13 on a shoulder 14 which circumscribes the inside wall of the housing cap, is a diaphragm 16. This is preferably constructed of steel and may be anywhere from ¼ to ⅝" or greater in thickness, depending upon the potential load. The diaphragm is positioned directly beneath the open end of coil 23 and substantially normal to the axis of the coil. To the upper surface of diaphragm 16 there is attached an inductor armature 24 positioned and aligned parallel to the face of the inductor coil and normal to the axis of the coil. The armature is secured to the upper surface of diaphragm by means of cap screw 25. The diaphragm is so constructed and supported as to form a concave or "dished" configuration (as indicated by the dotted lines beneath the upper surface of the diaphragm) when the diaphragm is depressed by suspending a weight from means connected to the diaphragm. In the embodiment shown in FIGURE 2, this connecting means 35 is an integral part of the diaphragm, projecting from the lower surface thereof and protruding through and freely movable in an aperture in the bottom of the housing cap 13. Integral with the diaphragm 16 and connecting member 35 is a connecting member 15 in the form of a hook or eye through which the cable 32 is threaded.

In the embodiment shown in FIGURE 2 the connecting member 35 has a flange portion 36 which is provided as a safety factor so that under emergency conditions, when it may be necessary to apply a force or load to the diaphragm 16 greater than the diaphragm is capable of withstanding, the flange portion 36, which overhangs a shoulder 37 formed by the inside bottom wall circumscribing the aperture in the housing cap 13, will contact said shoulder and prevent the diaphragm from rupturing.

In the preferred embodiment shown in FIGURE 2, the end face of the threaded portion of upper body member 11 is offset to accommodate the peripheral edge of the diaphragm 16 so that it will be clamped between the offset and the shoulder 14 on which the diaphragm is actually peripherally supported. There is further provided a pin 17 which prevents the diaphragm from rotating after the upper body portion 11 and the cap portion 13 have been threadably secured (20) together.

In order to exclude dirt and other extraneous matter from the housing there is provided a gasket 26 between the two portions of the housing, and also gasket 18 which forms a seal between the aperture in the cap portion 13 and the connecting member 35.

In operation the weight indicator is assembled as shown in the drawings and is suspended from a derrick or other fixed support. A cable is threaded through a sheave supported by the "eye" at the bottom of the device. When a tool is attached to the cable and lowered into the well casing, the tension load applied to the eye and connecting member 35 causes the upper surface of the diaphragm 16 to assume a concave configuration or a dish-like depression. This causes the inductor armature 24 to correspondingly move away from the coil 23 producing a gap between the armature and the coil core. The set screw 22 is used to adjust the size of this gap at zero load. When an additional load is placed upon the device the depression in the top surface of the diaphragm will increase and the effect can be measured by means of an electronic circuit receiving the resulting change in current from energized coil 23.

The electronic circuit for measuring the variations in the inductance of the coil as the gap distance between the armature 24 and the coil varies is schematically diagrammed in FIGURE 3. The variable inductor $L_2$ is the coil and armature assembly in the weight indicator. The power supplied to the system is 12 volts, 60 cycles as obtained from transformer T. There is provided in the circuit an inductor $L_1$ having the same inductance as $L_2$ in the housing of the weight indicator, at zero load. Due to the polarity of the diodes $D_1$ and $D_2$ on alternate half cycles of the applied voltage, the current (conventional) will flow first through $L_2$ along the path $e$—$a$—$b$—$d$—$f$ and then through $L_1$ along the path $f$—$c$—$b$—$d$—$e$. Due to the filtering action of the capacitator $C_2$ and the rectifying action of the diodes $D_1$ and $D_2$, D.C. voltages appear across the resistances $a$—$b$ and $b$—$c$ in opposite directions so that the total voltage across $a$—$c$ is zero when these two voltages are equal. In this condition there is no meter (M) deflection. If the inductance $L_2$ is reduced by the application of a load to the weight indicator, the current along the path $e$—$a$—$b$—$d$—$f$ will increase due to the lowered reactance of $L_2$. The voltage across $a$—$b$ will then increase making the point ($a$) more positive than the point ($c$) resulting in a flow of current through the meter and indicating the applied load.

The variable resistor $R_1$ is a zero reset control which can be adjusted until the sum of the opposite voltages across $a$—$b$ and $b$—$c$ is reduced to zero. The control $R_1$ is in the circuit only on the most sensitive range, when the switches $S_1$ and $S_2$ are in position 3. In switch positions 1 and 2, the sensitivity is reduced by the resistors $R_3$ and $R_4$, and the permanent zero set for these ranges is accomplished by the control $R_2$. Resistors $R_5$ and $R_6$ are selected to adjust the span of the zero reset control $R_1$. The capacitor $C_1$ increases the damping of the meter.

With the circuit arrangement as described, the values of the certain components may be varied over rather wide ranges providing the other components are varied to maintain the required conditions and circuit balance. To control the sensitivity of the system, the meter sensitivity, inductor sizes, resistor values or the thickness of the diaphragm 16 may be altered. Any frequency of power supply may be used with suitable changes in the component values.

In operation, the system is most frequently used on range 3, which makes use of the zero reset control and high sensitivity. In this position the absolute weight suspended from the weight indicator is not known, but small changes in weight are easily observed. As the weight continuously increases or decreases the zero reset control may be operated to keep the meter indicator on scale. On ranges 1 and 2 the total weight can be read, with zero deflection indicating zero load.

As previously indicated herein, the drawings exemplify a preferred embodiment of the invention which, however, contemplates minor departures, deviations and omissions in mechanical details within the scope of the appended claim. For example, instead of having the diaphragm 16 supported on shoulder 14 of housing cap portion 13, the inside wall of the cap can be bevelled, for example, at an angle of 30 to 45°, and the peripheral edge of the diaphragm correspondingly bevelled to register with the wall. Alternatively, the peripheral edge of the diaphragm 16 may be fastened to the inside wall of either the upper body portion or the inside wall of the cap housing by means of a plurality of set screws which traverse the walls of the housing members and seat in the edge face of the diaphragm. Also, it is to be understood that the flanges 36 of connecting member 35 may be omitted in the event that no emergency loads will be encountered which would unduly deflect the diaphragm 16.

The weight indicator has been described herein in terms of the view presented in FIGURE 2 with respect to upper and lower surfaces of the diaphragm 16, but it is to be understood that this has been done purely for convenience and for the sake of facilitating the description, and other means for expression may be used in delineating the invention.

Other types of variable inductors may be employed instead of the type specifically illustrated in the drawings. A hollow type is advantageous if the operating power frequency used is higher than 60 cycles.

Having thus described the nature and character of our invention, both generally and specifically, but with no intention of being limited by the specific mechanical features disclosed, what we desire to secure by Letters Patent is:

In a device for measuring the magnitude of a suspended weight, the combination comprising a housing consisting of an upper body portion and a lower cap portion threadably secured to each other, a variable inductor including a coil and an armature positioned in the body portions of said housing, means connecting one end of the inductor coil to the top inside wall of said body portion to adjustably secure the coil in position with respect to the inductor armature, a diaphragm supportably positioned upon a shoulder circumscribing the inside wall of the cap portion and clamped in said position by the bottom face of said upper body portion, the face of said diaphragm being directly beneath the face of and substantially normal to the axis of the inductor coil and adapted to form a concave configuration under tension load applied to the diaphragm normal to its surface, said inductor armature being secured to the upper surface of said diaphragm and aligned parallel to the face of the inductor coil core and normal to the axis of the coil, means projecting from the lower surface of and being an integral part of said diaphragm and protruding through and freely movable in an aperture in the bottom wall of said cap portion and further being integral with load-bearing means external of said cap and having a flange portion overhanging a shoulder formed by the inside bottom wall around the aperture of the housing cap, means for electrically energizing the inductor coil and means for measuring the resulting lowered inductance in the coil as the armature moves in relation thereto when a tension load is applied to the diaphragm.

References Cited in the file of this patent

UNITED STATES PATENTS

| | | |
|---|---|---|
| 1,580,430 | Gaines | Apr. 13, 1926 |
| 1,718,494 | Schurig | June 25, 1929 |
| 2,180,175 | Sivertsen | Nov. 14, 1939 |
| 2,276,843 | Hathaway | Mar. 17, 1942 |
| 2,298,216 | Lamberger et al. | Oct. 6, 1942 |
| 2,343,229 | Stone et al. | Feb. 29, 1944 |
| 2,361,173 | Browne | Oct. 24, 1944 |
| 2,414,161 | Moore | Jan. 14, 1947 |
| 2,536,117 | Abramson | Jan. 2, 1951 |
| 2,589,599 | Bond et al. | Mar. 18, 1952 |
| 2,623,386 | Baker | Dec. 30, 1952 |
| 2,645,120 | Scott | July 14, 1953 |
| 2,709,790 | Swanson | May 31, 1955 |
| 2,715,717 | Keithley | Aug. 16, 1955 |
| 2,775,887 | Hines | Jan. 1, 1957 |
| 2,786,669 | Stafford et al. | Mar. 26, 1957 |
| 2,857,126 | Deegan | Oct. 21, 1958 |

OTHER REFERENCES

Breunich: "Transducer Circuits for Control Operations," Product Engineering, 1953 Annual Handbook, page 129. (Copy in Division 36.)